Figures 1, 2:
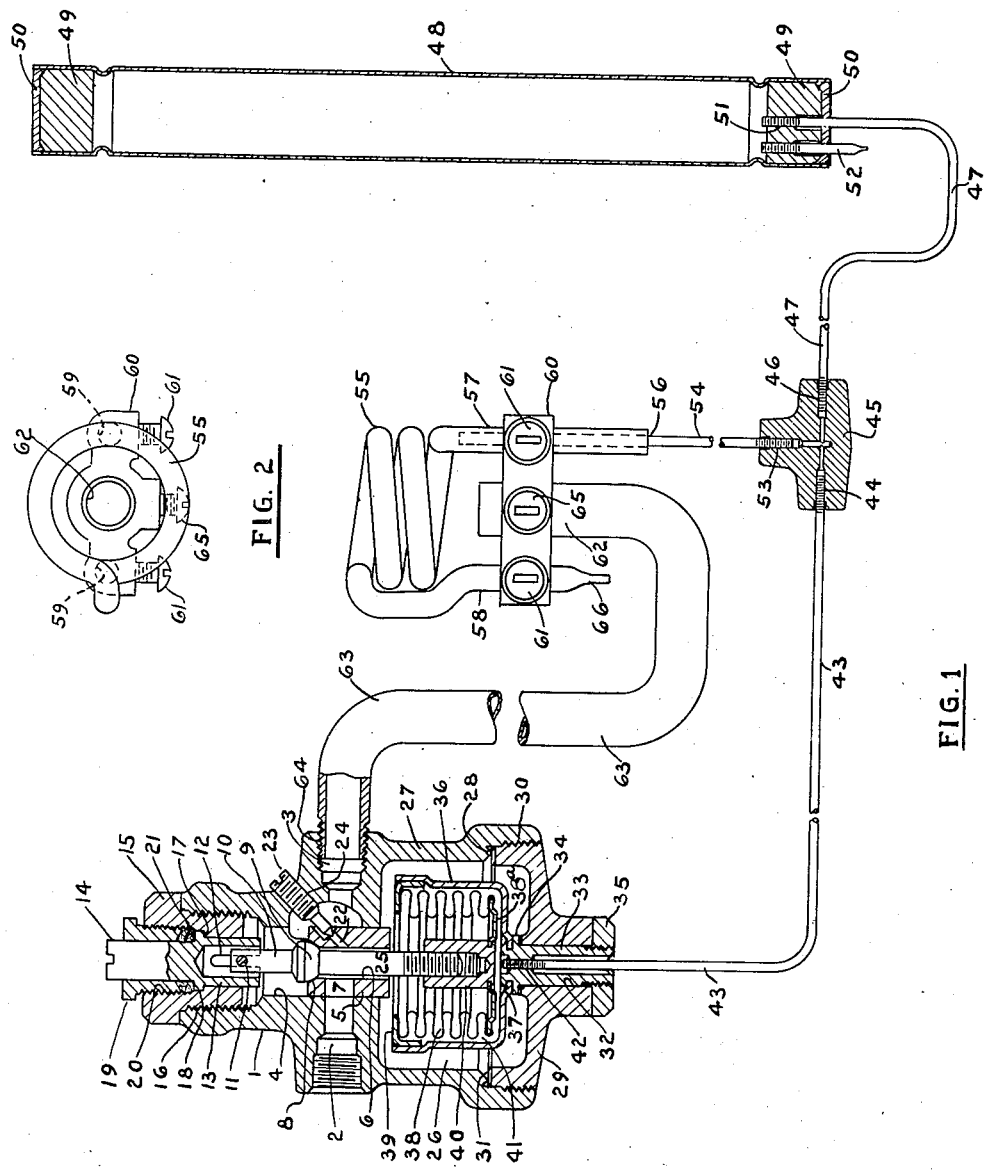

Sept. 21, 1937.  E. J. DILLMAN  2,093,693
CONTROL DEVICE
Filed July 11, 1933

INVENTOR
Earnest J. Dillman
BY
his ATTORNEY

Patented Sept. 21, 1937

2,093,693

UNITED STATES PATENT OFFICE 2,093,693

CONTROL DEVICE

Earnest J. Dillman, Detroit, Mich., assignor to Detroit Lubricator Company, Detroit, Mich., a corporation of Michigan Application July 11, 1933, Serial No. 679,844

17 Claims. (Cl. 236—1)

My invention relates to new and useful improvements in control devices, and more particularly to a device including a control means actuated in response to variation in a characteristic, such as temperature of a fluid medium.

An object of my invention is to provide an actuating means which is operable only upon the occurrence of a predetermined change in a characteristic of the fluid medium.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated a preferred embodiment of my invention, in which drawing—

Figure 1 is a view in elevation and partly in vertical central section of my novel control means and the actuating means therefor, and Fig. 2 is a detail top plan view of a part of the actuating means.

Referring to the drawing by characters of reference, I designates, generally, a hollow valve casing or body having an inlet port 2 and an outlet port 3. Within the casing there is a substantially cylindrical bore 4 extending transversely to the inlet and outlet, open at its upper end through the wall of the casing. Within the bore 4 and rigidly fixed therein, there is a sleeve member 5 having a longitudinal bore 6 therethrough coaxial with the bore 4 and in communication with the inlet port 2 through a side wall aperture 7. The upper end of the bore 6 terminates in a substantially conical valve seat 8 to receive a valve member 9 cooperable therewith to close the passage through the casing 1. The valve member 9 is provided with a stem 10 having a transverse pin 11 longitudinally reciprocable in diametrically opposite guide slots 12 formed in the cylindrical sleeve portion 13 of a rotary adjusting member 14. Surrounding the member 14 which projects from the bore 4 there is a bonnet member 15 screw-threaded, as at 16, into the bore 4 and having an annular, outward facing shoulder 17 cooperable with an annular flange 18 around the member 14 to limit inward movement of the member 14. A packing gland or nut 19 also surrounds the member 14 and is screw-threaded into a packing material receiving recess 20 formed in the bonnet member 15 and serves to press packing material 21 upon the top face of the flange 18 to prevent leakage around the adjustment member 14. Through the sleeve member 5 there is a by-pass passageway 22 which opens from the bore 6 on the inlet side of the valve seat 8 into the bore 4 for establishing communication between the inlet port 2 and the outlet port 3. Flow through the passageway 22 is controlled by a needle valve, or the like, 23 which is adjustably screw-threaded, as at 24, in an aperture through the side wall of the casing 1.

Preferably integral and rigid with the valve member 9 and extending through the bore 6 there is a push rod or thrust member 25. The underside of the casing 1 is provided with a substantially cylindrical recess or chamber 26 surrounding the lower end of the rod 25 and formed by a substantially cylindrical, depending flange 27 having a downward facing, internal, annular shoulder 28. The lower end of the chamber 26 is closed and sealed by a cap or closure member 29, preferably having screw-threaded engagement with the flange 27, as at 30, and abutting the shoulder 28. A packing ring or washer 31 may be provided between the shoulder 28 and the closure member 29 to seal the joint therebetween. Through the closure member 29 there is an aperture 32 preferably coaxial with the bore 6 and containing a substantially cylindrical supporting post 33 having a circumferential flange 34. The post 33 is rigidly secured in position with the flange 34 clamped tightly against the inside face of the closure member 29 by a nut 35 screw-threaded onto the projecting end of the post 33 and engaging the outer face of the closure member 29. Supported on the post 33 within the chamber 26 there is a casing or housing 36, preferably substantially cup-shaped and having an aperture through its bottom wall in which the upper end of the post 33 is rigidly secured and sealed, as at 37. The housing 36 is provided with a movable member or wall 38, preferably a longitudinally resilient, circumferentially corrugated, cylindrical metal element or bellows which is secured and sealed at one end to an annular member 38ª sealed to the inside face of the casing 36 at its rim. The other or inner end of the bellows 38 adjacent the bottom wall of the casing 36 is closed and sealed by a head or end wall 39 carrying an upstanding, hollow, internally threaded post or nut 40 which receives the threaded end of the push rod 25. The bellows 38 defines with the casing 36 a chamber 41 of variable volumetric capacity. Through the post 33 there is a longitudinal passageway which opens at its inner end into the chamber 41 and rigidly fixed and sealed in this passageway, as at 42, is one end of a tubular member 43, preferably of small, substantially capillary bore. The other end of the tube member 43 is secured and sealed, as at 44, in one branch passage of a T fitting 45. Secured and sealed in another branch passage of the fitting 45, as at 46, there is one end of a tubular member 47 of small, substantially capillary bore. The other end of the member 47 communicates with the interior of a sealed receptacle or bulb element 48, preferably in the form of a hollow cylinder having its ends closed and hermetically sealed by plugs 49 and solder, or the like, 50. The end of the member 47 which opens into the receptacle 48 is secured and sealed, as at 51, in an aperture through one of the plugs 49. This plug 49 is also preferably provided with a filler tube 52 through which the receptacle may be charged with a suitable expansible-contractible fluid, such as aniline, the tube 52 thereafter being closed and sealed. Secured and sealed, as at 53, in the third branch passageway of the fitting 45 there is one end of a tubular member 54, preferably of small, substantially capillary bore, which at its other end extends into a sealed receptacle or bulb element 55, the end of the member 54 being hermetically sealed into the receptacle 55 by solder, or the like, as at 56. The receptacle 55 is preferably in the form of a helical coil having its end portions 57, 58 extending substantially parallel to each other in laterally spaced relation. The end portions 57, 58 extend through and are secured in apertures 59 in a supporting or cross member 60 by means of set screws 61. The supporting member 60 also receives a terminal end portion 62 of a fluid fuel pipe 63 which at its other end leads from the valve casing 1 and is secured and sealed, as at 64, in the outlet port 3. The terminal end portion 62 terminates beneath or short of the receptacle 55 and serves as a burner and discharges upwardly substantially concentrically with the longitudinal axis of the coiled receptacle 55. A set screw, or the like, 65 serves to secure the supporting member 60 to the end portion 62. The receptacle 55 may be charged with an expansible-contractible fluid, such as aniline, through the end portion 58, which may then be closed and sealed, as at 66. The tubular members 43, 47 and 54 together comprise a conduit member which connects the receptacles 48 and 55 to the chamber 41. The quantity of expansible-contractible fluid contained in the receptacles 48 and 55 and with which they are charged is such that there must be a predetermined evacuation of the receptacle 55 by pressure created therein responsive to the temperature of the flame at the burner 62 in order to discharge fluid therefrom into the chamber 41 so that predetermined desired pressure existing in the receptacle 48 in response to temperature of the medium surrounding this receptacle can act to discharge fluid from the receptacle 48 into the chamber 41 to move the movable member 38 and actuate the control means 9. If desired, the volumetric capacity of the receptacle 55 may be substantially equal to the volumetric capacity of the chamber 41 when the valve 9 is seated so that the substantially complete evacuation of the fluid from the receptacle 55 will completely fill the chamber 41 without actuating the movable member 38, whereby expansion of the fluid in the receptacle 48 will discharge additional fluid into the chamber 41 to move the movable member and actuate the control means, the pressure within the receptacle 55 preventing discharge of fluid from the receptacle 48 into the receptacle 55. Assuming the valve 9 to be closed, the amount of gas or fluid fuel passing through the by-pass passageway 22 to the burner 62 to provide a pilot flame is controlled by the valve 24. Upon ignition of the gas issuing from the burner 62 via the passageway 22, the heat of the pilot flame will expand the fluid within the receptacle 55, volatilizing a portion thereof and discharging the remainder into the chamber 41. As long as the pilot flame is burning, the receptacle 55 will be substantially completely evacuated of fluid, but due to the proportioning of the parts the valve 9 will not be opened thereby. If now the temperature affecting the fluid within the receptacle 48 reaches the desired degree which will cause the desired expansion of the fluid therein, fluid will be discharged from the receptacle 48 into the chamber 41 and move the valve 9 toward open position, thereby permitting an increased flow of gas to the burner 62 to expand the burner flame to provide sufficient heat for use for work. The capillary tube 54 serves to prevent transmission of heat by conduction beyond the receptacle 55 so that increased heat to which the receptacle 55 is subjected when the flame at the burner 62 is expanded will not injure the actuating means by any substantial increase in fluid pressure. The temperature at which the valve 9 will be operated may be regulated by rotation of the adjusting member 14 which will act through the threaded end of the rod 25 and its cooperating nut or post 40 to vary the initial volumetric capacity of the chamber 41.

It will be apparent from the foregoing description that I have provided a safety means to prevent operation of a control means such as a gas valve in the absence of or upon failure of a pilot or other burner flame. It will be noted that the actuating means is disclosed as moving the valve toward open position upon increase of temperature or pressure in the receptacles 55 and 48 as the construction shown is particularly adapted for use in connection with refrigerating apparatus of the absorption type wherein the receptacle 48 would be subject to the temperature in or adjacent the evaporator or low side element.

What I claim and desire to secure by Letters Patent of the United States is:

1. A device of the character described, comprising a valve for controlling flow of fluid, a casing having a movable wall defining therewith a chamber of variable volumetric capacity, means operatively connecting said wall and said valve and operable on expansion of said chamber to open said valve, a burner, a bulb element subject to the temperature of the flame of said burner, a second bulb element, said elements being charged with an expansible-contractile fluid, and a conduit member communicatively connecting said elements to said chamber, the volumetric capacities of said elements and the fluid charges therein being so related to each other as to require operation of said burner before discharge of fluid from said second-named element can move said wall to open said valve.

2. A device of the character described, comprising a valve casing having an inlet and an outlet, a valve in said casing controlling flow therethrough, a housing carried by said casing, a metal bellows in said housing and defining therewith a sealed chamber of variable volumetric capacity, a push rod operatively connecting said bellows and said valve, a burner, pipe means connecting said outlet to said burner, said casing having a by-pass passageway for maintaining a pilot flame at said burner, a bulb element subject to the temperature of the flame of said burner, a second bulb element, said elements being charged with an expansible-contractible fluid, and a conduit member communicatively connecting said elements to said chamber, the volumetric capacities of said elements and the fluid charges therein being so related to each other as to require operation of said burner before discharge of fluid from said second-named element can move said wall to actuate said valve.

3. A device of the character described, comprising a valve, liquid charged thermostatic means for moving said valve to open position, said thermostatic means comprising an expansible chamber and a bulb element containing an expansible liquid, said bulb element when heated forcing liquid into said chamber, said thermostatic means being of sufficient capacity so that the liquid discharged on heating of said bulb element is insufficient to open said valve, a sealed receptacle communicating with said chamber and containing an expansible liquid, and means to heat said receptacle to force liquid therefrom into said thermostatic means whereby the liquid discharged from said bulb element will be sufficient to open said valve.

4. A device of the character described, comprising a valve, an expansible chamber having a movable wall operable upon expansion of said chamber to actuate said valve, means operatively connecting said wall and said valve, and a plurality of sealed receptacles communicating with said chamber and each containing an expansible liquid, said receptacles acting when heated to discharge liquid into said chamber, said chamber being of such capacity relative to the quantity of liquid discharged from said receptacles as to require a substantially complete discharge from one of said receptacles and also a discharge from another of said receptacles in order to expand said chamber sufficiently to actuate said valve.

5. A device of the character described, comprising a valve, an expansible chamber having a movable wall operable upon expansion of said chamber to actuate said valve, means operatively connecting said wall and said valve, a plurality of sealed receptacles communicating with said chamber and each containing an expansible liquid, said receptacles acting when heated to discharge liquid into said chamber, said chamber being of such capacity relative to the quantity of liquid discharged from said receptacles as to require a substantially complete discharge from one of said receptacles and also a discharge from another of said receptacles in order to expand said chamber sufficiently to actuate said valve, and a fluid fuel burner for heating one of said receptacles.

6. A device of the character described, comprising a valve, an expansible chamber having a movable wall operable upon expansion of said chamber to actuate said valve, a push rod operatively connecting said wall and said valve, means to regulate the operation of said valve by said wall, and a plurality of sealed receptacles communicating with said chamber and each containing an expansible liquid, said receptacles acting when heated to discharge liquid into said chamber, said chamber being of such capacity relative to the quantity of liquid discharged from said receptacles as to require a substantially complete discharge from one of said receptacles and also a discharge from another of said receptacles in order to expand said chamber sufficiently to actuate said valve.

7. A device of the character described, comprising a valve, an expansible chamber having a movable wall operable upon expansion of said chamber to actuate said valve, means operatively connecting said wall and said valve, means to adjust the effective length of said connecting means to control the operation of said valve, and a plurality of sealed receptacles communicating with said chamber and each containing an expansible liquid, said receptacles acting when heated to discharge liquid into said chamber, said chamber being of such capacity relative to the quantity of liquid discharged from said receptacles as to require a substantially complete discharge from one of said receptacles and also a discharge from another of said receptacles in order to expand said chamber sufficiently to actuate said valve.

8. A control device, comprising a fluid fuel burner, a valve controlling supply of fuel to said burner, thermostatic means including an expansible chamber for actuating said valve, a bulb element communicatively connected to said chamber and containing an expansible fluid, said bulb element being responsive to temperature created by said burner and discharging said expansible fluid into said chamber upon operation of said burner, the capacity of said chamber being such as to receive all of the expansible fluid from said bulb element without actuating said valve, and a second bulb element responsive to a temperature condition created by said burner, said second bulb element containing an expansible fluid and being communicatively connected to said chamber whereby discharge of expansible fluid from said second bulb element when said first bulb element is evacuated will actuate said valve.

9. In a refrigeration absorption system, a control device comprising a valve controlling supply of fluid fuel to a generator heating burner, thermostatic means responsive to temperature of the refrigerant evaporator for regulating the position of said valve, and thermostatic means operable to exert a force in conjunction with said first-named thermostatic means for rendering said first-named thermostatic means operable to regulate said valve, said second-named thermostatic means being responsive to temperature of said burner and acting upon failure of said burner to render said first-named thermostatic means ineffective to actuate said valve.

10. A control device comprising a movable control means, temperature responsive means for actuating said control means and being itself ineffective to actuate the same, and a second temperature responsive means cooperable with said first-named responsive means and operable on temperature change to transmit the force exerted by said first-named temperature responsive means to said control means.

11. A control device comprising a movable control means, a fluid fuel burner, temperature responsive means energized by the temperature of said burner for actuating said control means and being itself ineffective to actuate the same, and a second temperature responsive means cooperable with said first-named responsive means and operable on temperature change to transmit the force exerted by said first-named temperature responsive means to said control means.

12. In a heat transfer system, a valve for controlling flow of fluid, a heating means, thermostatic means responsive to the temperature of said heating means and operable during operation of said heating means to exert a force tending but being of insufficient magnitude to actuate said valve, and a second thermostatic means having operative connection with said valve and responsive to changes in the temperature of a means whose temperature is to be controlled, said second-named thermostatic means being operable upon an increase in the temperature of said controlled means to exert a force which combined with the force exerted by said first-named thermostatic means actuates said valve, the force exerted by said second-named thermostatic means being of insufficient magnitude to actuate said valve without the aid of said first-named thermostatic means whereby the valve will not be actuated in the event of failure of the heating means.

13. In a refrigeration absorption system, a valve for controlling the supplying of fluid fuel to a generator heating burner, thermostatic means responsive to the temperature of said burner and operable to exert a force directed but being of insufficient magnitude to move said valve to open position, and a second thermostatic means and responsive to the temperature of the refrigerant evaporator, said second-named thermostatic means being operable to exert a force upon a predetermined increase in evaporator temperature which combined with the force exerted by said first-named thermostatic means moves said valve to an open position, the force exerted by said second-named thermostatic means being insufficient to operate said valve without the aid of said first-named thermostatic means whereby the valve will not be opened in the event of extinguishment of said burner.

14. In a refrigeration absorption system, a valve for controlling the supplying of fluid fuel to a generator heating burner, a closed fluid line including a casing having an expansible chamber and a movable wall operable upon expansion of said chamber to move said valve to an open position, said line having a branch portion communicative therewith, a temperature responsive bulb in said branch portion and in heat exchange relation with said burner, an expansible-contractible fluid in said line and expansible by the heat applied to said bulb by said burner, said fluid being forced into said chamber but being insufficient in volume to move said wall, a second temperature responsive bulb member and in said line, said second-named bulb being responsive to the temperature of the refrigerant evaporator, a second charge of expansible-contractible fluid and in said line and expansible upon an increase in the temperature of said refrigerant evaporator to exert its force with that of said first-named expansible-contractible fluid to open said valve, the force exerted by the fluid in said second-named bulb being insufficient in magnitude to open said valve without the aid of the fluid in said first-named bulb whereby the valve will not be opened when the burner is not lighted.

15. In a system of the character described, a valve for controlling the supplying of a fluid fuel, a casing having an expansible chamber and a movable wall operable upon expansion of said chamber to actuate said valve, a quantity of fluid in said chamber during operation of the system and having its volume substantially equal to the volume of the chamber such that the wall will not be moved thereby, a temperature responsive fluid line communicative with said chamber, and an expansible-contractible fluid in said line and operable upon predetermined expansion thereof to exert its force to expand said chamber and actuate said valve, the force exerted by said expansible-contractible fluid being insufficient to operate the valve without the aid of the fluid in said chamber.

16. A control system comprising a valve and a heating means, thermostatic means expansible and contractible in accordance with temperature change remote from said heating means, a second thermostatic means cooperable with said first-named thermostatic means said valve and said heating means, said second-named thermostatic means acting upon heating thereof by said heating means to transmit the expansion and contraction of said first-named thermostatic means to said valve to regulate the position of said valve in accordance with temperature at said first-named thermostatic means.

17. A control system comprising a valve and a heating means, an expansible chambered element operatively connected to and for actuating said valve, a bulb element remote from said heating means and containing an expansible-contractible medium and communicatively connected to said chambered element, a second bulb element containing an expansible-contractible medium and responsive to temperature at said heating means and communicatively connected to said chambered element, the medium in said second-named bulb element acting on expansion when heated by said heating means to transmit expansion and contraction of the medium in said first-named bulb element to said chambered element to regulate the position of said valve.

EARNEST J. DILLMAN.